Sept. 10, 1963  R. M. INGHAM, JR  3,103,055
BOBBIN HANDLING APPARATUS
Original Filed Dec. 19, 1956  6 Sheets-Sheet 1

INVENTOR.
ROBERT M. INGHAM, JR.
BY
ATTORNEY

Sept. 10, 1963   R. M. INGHAM, JR   3,103,055
BOBBIN HANDLING APPARATUS
Original Filed Dec. 19, 1956   6 Sheets-Sheet 2

INVENTOR.
ROBERT M. INGHAM, JR.
BY
ATTORNEY

Sept. 10, 1963  R. M. INGHAM, JR  3,103,055
BOBBIN HANDLING APPARATUS
Original Filed Dec. 19, 1956  6 Sheets-Sheet 3

INVENTOR.
ROBERT M. INGHAM, JR.
BY
ATTORNEY

Sept. 10, 1963   R. M. INGHAM, JR   3,103,055
BOBBIN HANDLING APPARATUS
Original Filed Dec. 19, 1956   6 Sheets-Sheet 4

INVENTOR.
ROBERT M. INGHAM, JR.
BY
ATTORNEY

Sept. 10, 1963  R. M. INGHAM, JR  3,103,055
BOBBIN HANDLING APPARATUS
Original Filed Dec. 19, 1956  6 Sheets-Sheet 5

INVENTOR.
ROBERT M. INGHAM, JR.
BY
ATTORNEY

Sept. 10, 1963     R. M. INGHAM, JR     3,103,055
BOBBIN HANDLING APPARATUS
Original Filed Dec. 19, 1956     6 Sheets-Sheet 6

INVENTOR.
ROBERT M. INGHAM, JR.
BY
ATTORNEY 3,103,055
BOBBIN HANDLING APPARATUS
Robert M. Ingham, Jr., Spartanburg, S.C., assignor to Deering Milliken Research Corporation, Spartanburg, S.C., a corporation of Delaware
Original application Dec. 19, 1956, Ser. No. 629,306, now Patent No. 3,103,054, dated Sept. 10, 1963. Divided and this application June 4, 1959, Ser. No. 818,020
6 Claims. (Cl. 28—19)

This is a divisional application of the copending application of Robert M. Ingham, Jr., Richard Ferguson, and James L. Brown, Serial Number 629,306, filed December 19, 1956.

This invention relates generally to apparatus for conveying and separating a plurality of objects having loose tails and/or interconnecting and entangling yarn or the like therebetween, and more particularly to apparatus for conveying, separating, positioning and transmitting in sequential linear order for further processing, such as yarn cleaning or stripping, a plurality of quills or bobbins having tails thereon which are mutually entangled and which in the initial stage may consist of an entangled mass of quills or bobbins which are to be conveyed, separated, positioned and transmitted or discharged in linear sequential order.

A serious problem arises in the conveying and proper positioning of entangled quills which have a portion of yarn remaining thereon from a supply container to a cleaning apparatus, when such is to be accomplished through the action of an automatic conveyor. Particularly, the problem arises in the entangled relation of the quills such that it is extremely difficult to separate the quills one from the other in order that they may be suitably positioned in sequential alignment and properly transmitted to the cleaning apparatus. One of the serious disadvantages with previous apparatus lay in the difficulty of severing the yarn tails between the emmassed quills or the like, due particularly to the conveyor and cutter arrangements employed. Another difficulty lay in the fact that the quills were not conveyed in such a manner as to provide the most advantageous supply of individually separate and sequentially positioned quills which could be run or conveyed at a fast rate through the quill stripping or cleaning apparatus.

It is accordingly an object of this invention to provide an improved apparatus for conveying, separating, and positioning initially entangled and jumbled tail carrying quills having a portion of yarn left thereon, which is capable of high speed operation and which effectively severs the yarn tails while permitting such high speed operation and provides separated individual quills to a discharge point at a self-controlled rate as fits the individual needs of the subsequent operation, particularly adapted to supplying quills to a quill stripping apparatus, requiring the quills to be fed at a substantially predetermined rate so as not to jam the subsequent apparatus nor to leave empty periods when no quills are available and thus reduce the efficiency of the operation.

It is a further object of this invention to provide a conveying arrangement for entangled quills or the like in which a unique conveyor and cutter arrangement is provided such as to substantially improve the function of severing the yarn tails between the individual quills or the like.

Still a further object of the invention is to provide a bobbin or quill conveying and positioning apparatus which is quill controlled in such a manner as to present individually separate and properly positioned bobbins or quills at a discharge point at a desired rate suitable to meet the particular needs or desires.

A still further object is the provision of a unique bin-conveyor arrangement particularly adapted to supply and feed entangled objects; such as tail carrying quills, bobbins, or the like.

A major feature of the invention is the provision of a novel conveyor and cutter arrangement employing a unique reverse flow principal between the reverse flow conveyors in such a manner as to materially aid in severing the tails interconnecting and entangling quills which are conveyed.

Briefly, in one preferred embodiment of this invention a quill supply container in the form of a bin or hopper having an inclined floor and a discharge opening in one wall thereof is provided, and has a portion of the floor thereof formed by an inclined longitudinally reciprocably driven shaker having a ratchet-toothed surface. Disposed beneath the discharge end of the first or bin shaker is provided one or more pairs of peripherally engaging cutting rolls with the bite of each pair of rolls being disposed beneath the center of a corresponding tapered guide surface formed on or at the discharge end of the bin shaker so as to guide the tails between the cutters and into the bite thereof for severance of the trailing and interconnecting tails. Disposed beneath the cutter rolls is a second inclined longitudinally reciprocably driven ratchet-toothed shaker which is arranged in reversed flow relation to the flow of the quills as they feed from the upper or bin shaker. This angled and reverse flow arrangement materially aids in providing good registry of the tails in the bite of the cutter rolls. Also directly below the discharge end of the first conveyor surface and preceding the second shaker is an inclined weight-sensitive floor which is operatively connected to a switch for controlling the operation of the first reciprocable shaker. Disposed above the second or reverse flow reciprocable shaker is a pivotally mounted height-sensitive arm which is also connected to a switch in the control circuit for the drive means for the first reciprocable shaker. Preferably, this height-sensitive arm has a ratchet-toothed lower surface which cooperates with the ratchet-toothed upper surface of the second conveyor to provide efficient substantially individual discharge of quills from this second reciprocable surface. The two switches are preferably arranged in series connection with a solenoid valve which controls the air supply to a rotary valve in turn providing an air drive to a motor for reciprocating the first shaker. Disposed beneath the discharge end of the second shaker are one or more pairs of roll cutters similar to the roll cutters beneath the upper or first shaker. Also the discharge end of the second shaker has a tapered guide or guides formed on the end thereof, or beneath the same on a separate member, so as to guide the trailing or interconnecting yarn into the bite of the corresponding pair or pairs of cutters. Additionally disposed beneath the discharge end of the second or final shaker is a weight-sensitive floor in a hopper leading into a belt conveyor which is preferably of a type disclosed in the co-pending application of R. M. Ingham, Jr., Serial No. 411,480, filed February 19, 1954, now U.S. Patent No. 2,854,730 and which has a pair of inclined belts arranged in spaced-apart parallel relation and slanted with relation to each other in such a manner as to provide a slanted web conveyor surface for conveying the quills to a discharge point adjacent a stationary slide forming a trough for subsequent feeding to a quill cleaning apparatus. Arranged above the belt conveyor in the path of quills that may be piled up too high as they proceed along the conveyor is a height-sensitive switch-operating device in the form of a light-weight depending ball which when moved upwardly causes a switch to open. Also disposed along the path of the depending quills on the belt conveyor is a pair of spaced apart switch-controlling elements which are sensitive to the passage of each individual quill thereby. This last pair of switch-controlling elements preferably takes the form of a pair of feeler fingers which extend into the side of the conveyor and contact the quills as they pass by. These two fingers and their associated switches are arranged in the circuit for controlling the motor which drives the lower shaker such that the motor will be deenergized when the two fingers each sense at the same time a quill adjacent each thereof indicating that the bobbins or quills are in very close proximity to each other at this point, which is near the upper or discharge end of the belt conveyor. The weight-sensitive floor, the height-sensitive arm and the pair of finger controlled switches are arranged in mutual series relation with a solenoid valve which controls the transmission of pressurized air to a rotary valve in turn controlling the flow of air to an air driven motor for the second shaker.

Various modifications of certain aspects of the invention in the following detailed description, and many other modifications and embodiments within the scope and spirit of the invention will become apparent to those skilled in the art.

Still further objects and many attendant advantages will become readily apparent to one skilled in the art from a reading of the following detailed description of several embodiments of the invention, taken in conjunction with the accompanying drawings, wherein.

Figure 1:
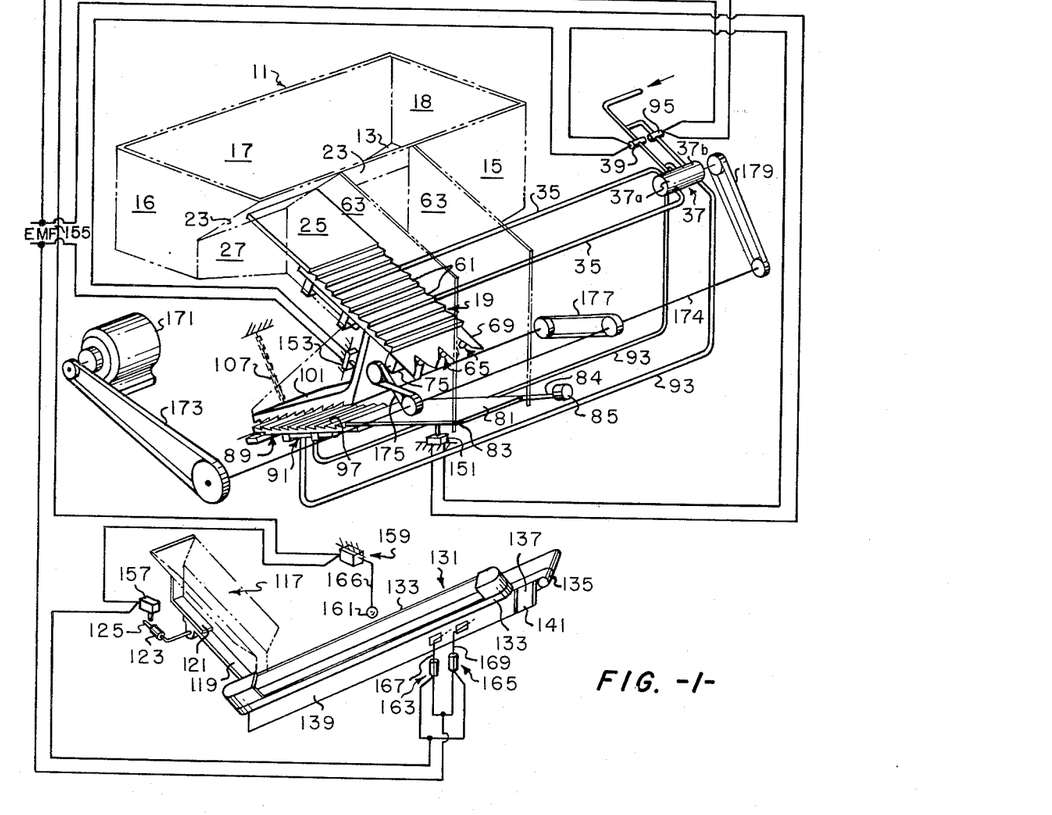
FIGURE 1 is a schematic illustration of a preferred embodiment according to the invention.
Figure 5:
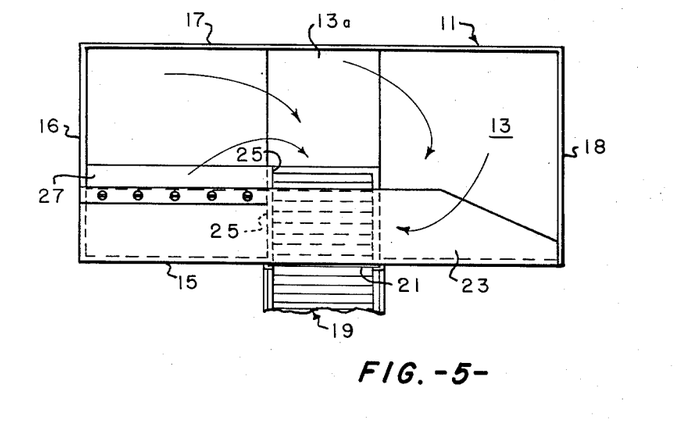
FIGURE 5 is a plan view of the bin and first shaker arrangement as shown in FIGURE 1.
Figure 5A:
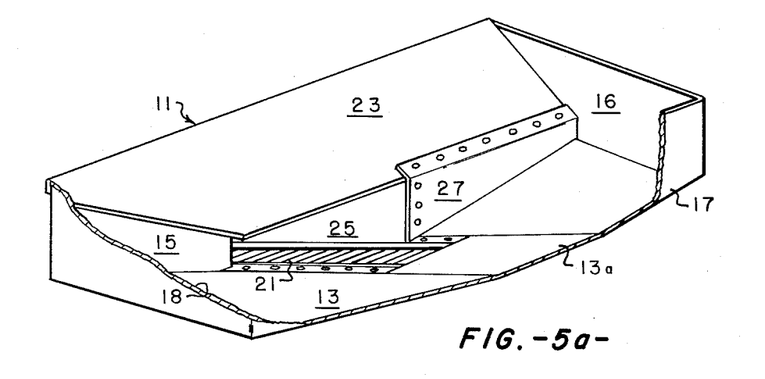
FIGURE 5a is a perspective view of the supply bin from above the rear right-hand corner of the bin as shown in FIGURE 1.

Referring now in more detail to the figures of the drawings, a bobbin or quill supply container in the form of a bin or hopper 11 is suitably mounted in fixed relation on suitable supports (not shown), the bin preferably having an open top for the purpose of pouring bobbins thereinto. The bin 11 preferably has a sloping bottom 13, with the slope being directed downwardly from all walls 15–18 thereof toward a reciprocably mounted shaker 19 which forms the bottom of the bin adjacent a lateral discharge opening 21 (see FIGURES 5a and 6) formed in the front wall 15 of the bin. The bin preferably is also formed in such a manner that the bobbins or quills therein will flow as a group in a partial circular motion onto this first shaker 19 from the rear of the shaker and one lateral side thereof. To this end the bin is provided with a rearwardly and downwardly sloping baffle 23 extending from adjacent the top front edge of the bin and extending substantially across the width of the bin 11, a substantially vertical side plate 25 disposed adjacent the left lateral side of the shaker 19 and an additional substantially vertically extending or downwardly sloping transverse baffle 27, these baffles and the side plate being interconnected at their junctions and with the walls 15, 16 and bottom 13 of the bin. The space adjacent the right-hand lateral side of the first shaker, as viewed in FIGURE 1, is open to the movement of bobbins thereonto within the bin 11. It will be seen that the bobbins are permitted to progress onto the reciprocable shaker 19 either from the rear thereof or from one lateral side thereof, but are prevented from progressing onto the shaker from the other lateral side thereof through the medium of the baffle and side plate arrangement 23, 25, 27. It has been found that this arrangement provides a particularly advantageous flow of bobbins onto the shaker 19 in the vicinity of the discharge opening 21 of the bin. When the bin is provided with only a conventional sloping bottom it has been found that bobbins tend to jam at the discharge opening and hamper the conveying action of the shaker due to the fact that the bobbins converge onto the shaker from all directions. By providing this baffle and side plate arrangement 23, 25, 27 the bobbins are prevented from progressing onto the first shaker from one lateral side thereof at least in the vicinity of the discharge opening of the bin, and are permitted to progress onto the first shaker 19 from the rear thereof and from the opposite lateral side, thus providing a unique circular flow of the group of bobbins in the bin in a clockwise direction as illustrated in FIGURES 1 and 5 as shown generally by the arrows thereon. This effectively provides a smooth flow of bobbins onto the shaker, while substantially preventing any jamming of the bobbins at the discharge opening such as to interfere with the conveying and processing action of the shaker 19, yet permitting the employment of a large capacity bin of convenient external configuration and size.

The bobbins or quills which are placed in the bin 11 are normally of a conglomerate nature in that they have yarn remaining thereon and extending therefrom in such a manner that the yarn on the bobbins tends to interconnect various ones or groups of the bobbins, making them extremely difficult to handle and particularly difficult from the standpoint of preparing such bobbins or quills for entry into a bobbin or quill cleaning apparatus of the type wherein the bobbin must be conveyed thereto in linear sequential order. The first reciprocable shaker 19 and each of the additional conveying mediums of this apparatus are thus each provided to accomplish at least two functions, one of which is the conveying of the bobbins or quills to, and the positioning thereof at, a discharge point in substantially continuous linear sequential order and secondly to separate the mutually entangled bobbins or quills such that they may be suitably conveyed and positioned by the final conveying medium in linear sequential order or otherwise as may be desired in separate, individual order, or disconnected fashion. To this end the first reciprocably mounted shaker 19 is provided with a suitable reciprocating drive mechanism, preferably in the form of a reciprocating air motor 30 having a body cylinder 31 suitably mounted as on a pair of brackets 33 secured to the underside of the framework supporting the first shaker 19. Air motor 30 is energized through the medium of a pair of air conduits 35 connected to a source of air pressure, not shown, through the medium of one valve section 37a of a dual section rotary reversing valve 37 and a solenoid control valve 39 as will be later described in more detail. The motor 30 is suitably connected in driving relation to the first reciprocal shaker 19 as through the medium of a direct fixed connection 41 between the bottom of the shaker 19 and the reciprocably driven piston 43 of the air motor. In order to provide for smooth reversal of direction of the reciprocating shaker 19 at each end of its stroke, there is suitably secured to the shaker at its rearward end one or more longitudinally extending shafts 45 which have mounted thereon a pair of resilient compression springs 47, 49. Spring 47 is held against outward movement as through the medium of an end collar or flange arrangement 51. Intermediate of the two springs 47 and 49 there is provided a stationary bracket plate 53 having an aperture therein within which the shaft 45 is slidably mounted. It will thus be seen that the springs 47 and 49 respectively engage the opposite sides of bracket plate 53 and are compressed during reciprocating motion of the shaker 19 and thus provide smooth decelerating buffer action for the shaker during this reciprocation, thereby minimizing vibration damage to the parts.

The shaker 19 is reciprocably mounted for sliding movement within a pair of spaced apart channel guides 55 suitably secured to the central forwardly sloping bottom plate 13a of the bin bottom 13. The extreme forward reciprocating position of the reciprocable shaker 19 is such that the rear end of the shaker is underneath the bottom plate 13a, in order to prevent the lodging of any bobbins or quills between the shaker and the bottom plate during operation of the shaker 19.

The sloping baffle 23 materially aids in preventing the entire assemblage of bobbins from falling or moving out through the discharge opening 21 in the front of the bin 11; however, there may still be some tendency in some instances for the bobbins to emerge in larger quantities than desired during the reciprocating motion of the shaker 19, and to this end a downwardly depending pivotally mounted door 57 (which is preferably weighted as by a weight 58, see FIGURE 6, or biased by a spring, not shown, connected thereto) may be mounted on the bin and may be positioned to selectively extend over the upper portion of the opening 21 in order to effect an evening of the bobbins as they proceed out of the bin upon the upper surface of the shaker 19.

The upper surface of the shaker 19 preferably is formed with ratchet-toothed steps 61 thereon, the steps being approximately 1¾ inch lengths and about ½ inch deep in one preferred embodiment of the invention wherein quills are conveyed and processed through the apparatus.

On each lateral side of the discharge opening 21 and door 57 a guard plate 63 is mounted in order to prevent the quills from sliding laterally off the sides of the shaker 19 during their movement downwardly thereon. These side guard plates 63 extend away from the bin 11 to a position substantially forwardly of the discharge end of the shaker 19.

Mounted adjacent and beneath the discharge end of the reciprocating shaker 19 are three pairs of roll cutters, generally designated 65, disposed in lateral side-by-side relationship, which serve the purpose of severing yarn tails extending between bobbins or quills or trailing from bobbins or quills as they fall. In order to assure that the greatest number of yarn tails and/or interconnected yarn ends pass into the bite of the roll cutters 65 while preventing the bobbins or quills from themselves materially engaging the cutters and becoming marred or injuring the cutters, a corresponding plurality of tapered V-shaped guides 67 (see FIGURE 3) are provided above the roll cutters 65 and beneath and forwardly of the discharge end of the shaker 19. In the preferred embodiment these tapered guides are formed in a single plate 69 secured to the channel members 55. As seen most clearly in FIGURES 1 and 3, each of the guides 67 is disposed in substantial alignment with the bite of its respective pair of roll cutters 65, and the apex of each guide 67 extends rearwardly to a point slightly behind the effective cutting plane of its pair of roll cutters.

In a preferred embodiment of the roll cutters 65, each pair of roll cutters comprises a knife roll 71 and an anvil roll 73 (see FIGURE 4) resiliently biased into mutually peripheral engagement in a manner similar to that disclosed in the copending application of Fred D. Perkins and R. M. Ingham, Jr., Serial No. 421,904, filed April 8, 1954, now U.S. Patent No. 2,890,751, with one of the rolls being rotatably driven through the medium of a drive shaft 75 connected to the driven roll as through a worm, worm-gear drive suitably disposed within a gear box 77. As is disclosed in the above mentioned Perkins-Ingham copending application, the rotatably driven shaft 72 which supports and drives the knife roll 71 is preferably protected from the wrapping of yarn ends thereon through the medium of a stationary shield tube 78 circumferentially surrounding the drive shaft 72 to the knife roll 71, while the anvil roll 73 preferably takes the form of the outer race of a ball bearing, the inner race of which is stationarily mounted upon a stationary eccentrically mounted shaft 79. The eccentric shaft 79 is resiliently biased in a clockwise (or counterclockwise) direction as shown by the arrows in FIGURE 4, through the medium of a spring suitably arranged within the gear box 77, in order to resiliently bias the anvil roll 73 into contact with the rotatably driven knife roll 71.

Figure 3:
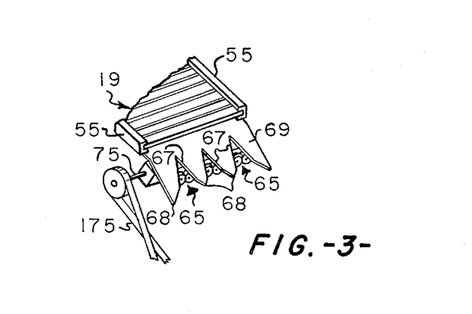
FIGURE 3 is a fragmentary view of the discharge end of the first shaker and associated cutter arrangement of FIGURE 1.

The V-shaped guide 67 is preferably graduated in taper as through a double-taper, as shown particularly in FIGURE 3 in order to assure the greatest amount of yarn-guiding action at all points on its surfaces, while also serving substantially to prevent contact between the bobbins or quills and the cutters, as mentioned above. The greatest taper is formed adjacent the outer ends of the tongues 68 formed between the guide openings 67, in order to bring the tongues to a point without undue length and thus assure that there is no flat end surface which does not serve a guiding purpose for the yarn ends, while the rear portion of the guide openings 67 has the smaller taper angle in order to more positively guide the yarn ends toward the bite of the roll cutters 65. The disposal of the roll cutters adjacent and beneath the discharge end of the inclined reciprocating shaker 19, together with guides 67, 69 for guiding the yarn into the bite of the cutters as the yarn proceeds past the cutters during or after the fall of the various bobbins or quills, is an important aspect of the invention.

As will be noted particularly from FIGURE 6 the plane of rotation of the roll cutters 65 is preferably inclined to the surface of the upper or first shaker 19 and the guide plate 69 and is also inclined to the path of the strands of yarn which extend from a position on the first shaker 19 to a position below the cutters 65 and beneath the first shaker 19. This disposition of the roll cutters between the discharge end of the first shaker 19 and the reverse flow second shaker, next to be described, as well as the positioning of the plane of rotation of the roll cutters at an angle to the path of the yarn ends extending between these two shakers, constitute further important aspects of this invention, and serve to materially aid in the effective severing of the yarn ends extending between the various bobbins or quills.

As the bobbins or quills are fed over the discharge end of the first reciprocable shaker 19 and the guide plate 69 they fall onto a floor 81 pivotally mounted as indicated at 83 and counterweighted as through the medium of a weight 85 connected thereto. The floor 81 extends downwardly in a rearward flow direction in relation to the direction of quill conveying movement on the first shaker 19. Extending upwardly from the pivot point 83 there is mounted a stationary end guard plate 87 (see FIGURE 6) forming a guard to prevent the bobbins or quills from leaving the intended conveying area from the first shaker 19 onto the pivotally mounted floor 81. The end guard plate 87 is disposed at a suitable distance from the guide plate 69 such that there is ample room for the bobbins or quills to be discharged from the first shaker 19 onto the floor 81 for their continued passage through the apparatus. The side guard plates 63 extend downwardly adjacent the sides of the pivotally mounted floor 81 and thus also aid in containing the quills or bobbins as they fall onto and proceed along the floor 81.

Suitably mounted in a channel guide arrangement (not shown) similar to the channel guide arrangement 55 for the first reciprocating shaker 19 there is provided a second reciprocable shaker 89 which is also driven in a similar manner to the first shaker 19 as through the medium of an air driven motor 91. The air driven motor 91 is powered through the medium of air conveyed thereto through a pair of conduits 93 extending from a rotary valve which is preferably the second valve section 37b of dual valve 37 as described above in connection with the first shaker 19. However, it will be obvious that two completely separate and separately driven valves might be employed if desired. The flowing of air to the second half of the inlet 37b of the rotary valve 37 is controlled through the medium of a solenoid valve 95 also connected to a suitable source of pressurized air or the like, not shown. The various controls for the two solenoid valves 39 and 95 will be later described as the description proceeds. In order to provide the most advantageous conveying action by the second shaker 89 the upper surface of the shaker is also provided with ratchet-toothed steps 97 formed thereon.

Figure 6:
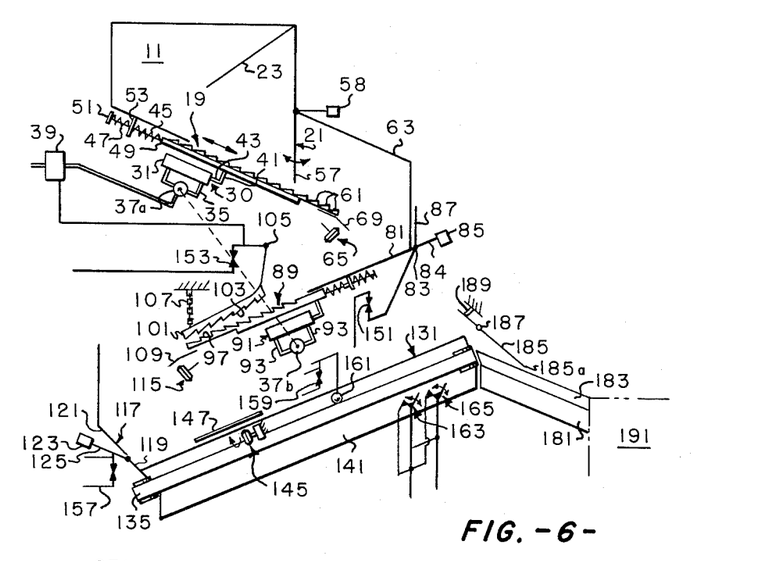
FIGURE 6 is a schematic diagram in elevation further illustrating the arrangement and operation of the preferred embodiment shown in FIGURE 1.

As will be noted particularly in FIGURES 1 and 6, the direction of movement of the quills or bobbins on the second reciprocating shaker 89 is laterally reversed from that in which the bobbins or quills are conveyed on the upper or first shaker 19. This provides a very important feature of the invention in that the bobbins or quills are thus pulled rearwardly beneath and behind the discharge end of the first shaker, whereby the yarn tails are pulled into the bite of the roll cutters 65 in a highly effective manner through the movement of the quills on the second reverse flow conveyor, which in the preferred embodiment takes the form of reciprocating shaker 89. This further aids in assuring the maximum effective functioning of the roll cutters 65 in severing the yarn connections between the various bobbins or quills or groups thereof. The quills or bobbins proceeding along the path formed by the floor 81 and the upper surface of the second shaker 89 are in a much more separated and controllable state than the bobbins or quills in the bin 11 and on the first shaker 19, due to the highly effective severing action which takes place as the bobbins or quills drop onto the floor 81, and are conveyed rearwardly and downwardly on the floor 81 and the shaker 89 by gravity and by the reciprocable push-pull action on the quills by the ratchet-toothed second shaker 89. However, due to the fact that the bobbins or quills are often in such a jumbled mass as they proceed over the discharge end of the first shaker 19 there are usually a number of quills or bobbins which pass over in groups and do not have their connecting yarn ends severed by the roll cutters 65. To this end there are mounted beneath the discharge end of shaker 89 two additional pairs of roll cutters 115, each pair of which is substantially identical to the roll cutters 65 previously described and shown in FIGURE 4. Also disposed beneath the discharge end of the second shaker 89 is a guide plate 109, similar to that in FIGURE 3, except that two V-shaped guide openings are formed therein instead of three, these V-shaped guide openings each being aligned with the bite of its respective roll cutters 115.

It will be apparent that while three pairs of cutters 65 are employed beneath the discharge end of the first shaker 19 and two pairs of roll cutters are employed beneath the discharge end of the second shaker (the small number being employed due to the smaller number of yarn ends remaining to be severed), it will be apparent that more or less roll cutters might suitably be employed in order to fit the needs of any particular situation. However, through the medium of laterally side-by-side spaced pairs of cutters 65 and 115 it is possible to employ a much wider conveyor surface for the shaker 19 and the shaker 89 than would be feasible with a single pair of roll cutters under a particular conveyor. It will be also apparent that while other types of yarn cutters may in some instances be suitable for a particular application of the reverse flow conveying surface and cutter aspect of the invention as disclosed herein, the employment of roll cutters is much the most advantageous in this arrangement due to the high degree of efficiency, the continued cutting action, and the inherent safety thereof, to name only a few of several advantages.

Pivotally mounted in rearwardly extending depending relation above the second shaker 89 is an overhead door 101, the undersurface of which is preferably ratchet-toothed as indicated at 103. The door 101 may be pivotally mounted as indicated at 105 on any suitable portion of the apparatus supporting frame, not shown. The free lower end of the door 101 is preferably supported in spaced apart relation from the upper surface of the second shaker 89, as through the medium of a supporting chain 107, the upper end of which is secured to a suitable portion of the framework, as for example, bracket 33, and the lower end of which is secured to the upper surface of door 101. It will be apparent that the chain 107 may readily be adjusted, if desired, to vary the spacing between the lower end of the door 101 and the upper surface of the shaker 89 to any desired distance. In the preferred application of the invention in conveying or processing quills or bobbins or the like for feeding to a quill stripper or the like it has been found most advantageous to limit the lower position of the door 101 to a height such that the distance between the two ratchet-toothed surfaces 103 and 97 is approximately equal to the diameter of a quill or bobbin at its largest point, in order to achieve an approximate one-by-one feeding of the bobbins or quills from the discharge end of the second shaker 89. As will be seen in FIGURES 1 and 2 the door 101 is preferably shaped and mounted such that the upper end of the lower surface of the door is spaced a further distance away from the shaker 89 than is the lower end when the door is in its lowermost position. It will be thus seen that this provides an effective funnelling action on the bobbins or quills as they proceed from the pivotally mounted floor 81 onto and along the shaker 89 to the discharge end thereof, whereas stated above it is desired that the quills or bobbins be discharged singly (although, as will be obvious, this desired one-by-one discharge is not always exactly achieved in actual practice).

It is easy to this end of providing substantially individual discharge of bobbins or quills from the shaker 89 that the floor surface 103 of the door 101 is ratchet-toothed as described above. It will be seen that through the cooperative relationship between the two ratchet-toothed surfaces of the reciprocating shaker and the door 101, which effectively form a tapered funnel as noted above, there is provided a progressing action on the quills or bobbins adjacent the toothed or stepped surface 97 of the shaker 89 while the ratchet-toothed surface of surface 103 tends to prevent the bobbins in contact therewith from moving either forwardly or rearwardly, the forwardly action being retarded by the general inward taper of the funnel formed between the door 101 and the shaker 89 while the rearward action tends to be prevented by the ratchet teeth 103. In addition to this direct quill controlling action the pivotally mounted door 101 also may serve an additional function as a volume or height overload sensing device for controlling the operation of the first shaker, as will be later described in connection with the control circuitry for the overall apparatus, although in many applications this latter function of the door 101 may be suitably omitted, if desired.

As described above, the bobbins proceed from the discharge end of the shaker 89 over the guide plate 109 and past the second set of roll cutters 115, whereupon they fall into a second discharge hopper 117 which forms the supply hopper for an inclined belt trough-shaped continuous conveyor 131, later to be described.

The hopper 117 is preferably funnel or trough-shaped in order to most advantageously feed the quills or bobbins into the trough formed by the belt conveyor 131. The discharge hopper 117 is disposed beneath the discharge end of the shaker 89, and has a pivotally mounted weight-sensitive downwardly extending floor 119. Preferably the bin has a stationary section 121 of flooring adjacent the pivotally mounted section 119, and the stationary section 121 is suitably disposed beneath the discharge end of the shaker 89 whereby the bobbins or quills fall substantially on the stationary section 121 in order to prevent undesirable false actuation of the switch control (later to be described), by the pivotally mounted floor 119. It will be apparent, however, that other methods might be utilized for preventing false or undesired stops of the shaker 89 by the floor 119 such as the utilization of a time delay switch for actuation by the pivotally mounted floor 119, or in some instances suitable counterweighting alone may be sufficient for this purpose. The pivotally mounted floor 119 is connected in controlling relation with the drive motor 91 for the second shaker 89, and serves to stop this motor when a particular weight of bobbins or quills is disposed thereon, as will be further described as the description proceeds. In order to vary the weight-sensing characteristics of the floor 119, a slidable counterweight 123 may be operatively connected to the floor 119 as through the medium of an arm 125 or the like. The bobbins or quills proceed downwardly and forwardly in the bin 117 which is also preferably trough-shaped in order to more advantageously feed the bobbins or quills into the belt conveyor 131.

The conveyor 131 is preferably a continuous belt trough-shaped conveyor of the type shown in the copending application of R. M. Ingham, Jr., Serial No. 411,480, wherein a pair of continuous belts 133, 135 are arranged in spaced apart relation and inclined both in respect to one another and in respect to the horizontal in order to provide an upwardly directed trough-shaped conveyor having a central slot 137 formed between the belts whereby the quills are conveyed along the slot 137 with their enlarged heads or bases supported in frictional engagement on the belts 133, 135 and their smaller end depending down into the slot 137. As is disclosed in the copending application, the inclination of the belts 133, 135 in respect to each other and in respect to the horizontal also serves to dynamically convey and align the bobbins or quills such that they are dynamically directed into and conveyed along the slot 137. The belts 133 and 135 are preferably continuously driven through any suitable drive means (not shown). Preferably there is disposed on either side of the slot a pair of side plates 139 and 141 which serve to prevent "chopsticking" of the depending ends of the quills or bobbins particularly as they approach the discharge end of the conveyor 131.

Figure 2:
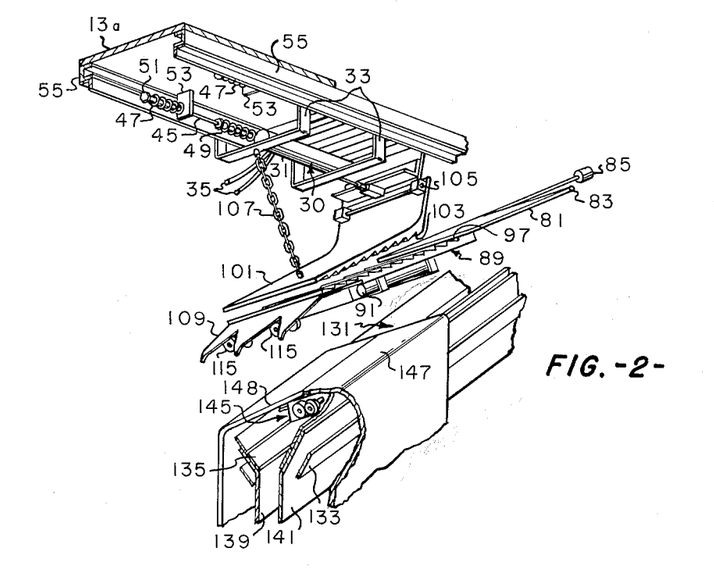
FIGURE 2 is a fragmentary view in perspective illustrating in more detail the first and second shakers of FIGURE 1 and the trough-shaped belt conveyor and associated cutter arrangement.

As seen most clearly in FIGURES 2 and 6, there is disposed above and in close adjacency to the belts 133, 135 an additional pair of roll cutters 145 similar to the roll cutters 65 and 115, which are continuously driven from any suitable means, not shown. The roll cutters 145 are disposed in counter reverse-flow direction beneath and rearwardly of the discharge end of the shaker 89, and preferably are disposed substantially within or closely above the trough formed by the two inclined belts 133, 135 in order to most effectively sever any upwardly extending trailing ends on the quills that pass thereby on the belts. To the end that substantially all of the yarn ends will be directed into the bite of the roll cutters 145 aligned with the slot 137, there is suitably mounted above the roll cutters 145 a guide plate 147 having a relatively long V-shaped guide surface 148 formed therein the apex of which is in alignment with and closely adjacent the bite of the cutters 145. As will be seen in FIGURE 6, the roll cutters 145 are rotated in a direction such that the periphery of each of the rolls thereof in the vicinity of the bite is moving upwardly away from the conveying surfaces formed by the belts 133, 135. It will be seen that this provides a self-feeding action to the rolls or the cutters 145, since yarn ends which engage the rolls along their lower peripheral edges and will thus be fed upwardly and into the bite of the rolls, particularly with the aid of the V-shaped guide 147, 148 when the yarn ends extend from the quills on the conveyor 131 to the quills on the shaker 89. The close adjacency of the roll cutters 145 to the belt trough and slot 137 is highly effective in severing substantially all remaining trailing yarn ends which have escaped both the cutters 65 and 115 and in severing these tails very close to the quills or bobbins so as to provide a very short tail which does not interfere with the conveying action into the subsequent apparatus such as a quill stripping device or collecting bin or the like as may be desired.

Referring now to the control system for the various quills or bobbin conveying media of the apparatus, there is provided a dual control for the motor 31 which drives the first shaker 19. This control system for the first shaker includes the weight-sensitive, pivotally mounted floor 81, a sensitive switch, such as a microswitch, 151, normally closed, but opened by counterclockwise movement of the floor 81 past a predetermined angular position which may be set as desired. Adjustment of weight 85 longitudinally on its supporting arm 84 may be suitably employed for varying the foot poundage on the floor 81 which is necessary to open the switch 151, or alternatively a spring may be employed to resiliently counterbias the floor 81. There may be further included as an additional optional control for the motor 31, a sensitive switch 153 disposed adjacent and operated in response to the movement of the pivotally mounted door 101. The switch 153 is normally closed when the door 101 is in its lowermost position, as shown in FIGURE 1, and is opened through movement of the door 101 to a predetermined height above the shaker 89, which may be varied as the particular situation dictates. The two switches 151, and 153 are normally closed as stated above, and are in series connection with the solenoid valve 39 and a suitable source of voltage generally indicated at 155. It will thus be seen that the shaker 19 will be reciprocated by the motor 31 at all times except when the solenoid 39 is deenergized through the opening of either switch 151 or 153 by their respective actuating media, pivotally mounted floor 81 and pivotally mounted door 101. When either the floor 81 has a certain predetermined weight thereon or when the height of the quills on the shaker 89 contains a certain predetermined height, as for instance, approximately one and one-half bobbin diameters at the height at the lower end thereof, the respective switch 151 or 153 will be opened and the air supply to the motor 31 will be cut off through the deenergization of the solenoid 39. This deenergization of the motor 31 will continue until the shaker 89 has conveyed a sufficient number of bobbins therefrom to additionally lower the height of the bobbins or quills thereon to a point such as to close switch 153 or to remove sufficient bobbins from the pivotally mounted floor 81 as to permit the switch 151 to be closed, as the case may be. As stated above, the switch 153 is optional, and in many instances may be eliminated, due particularly to the fine degree of control exercised through the medium of the pivotally mounted floor 81.

The control arrangement for the second shaker comprises the pivotally mounted floor 119 and a normally closed sensitive switch, such as a microswitch 157, a normally closed height-sensitive switch arrangement 159 including a lightweight ball or mass 161 (such as a large ball of foam plastic or the like) mounted in depending relation above the center of the slot 137, and a pair of parallel arranged microswitches 163, 165 having resilient feeler fingers 167—169 extending into the slot 137 through suitable openings in one of the side plates 139 or 141.

The switch 159 is spring-biased in a direction such that when the weight of the ball 161 is relieved as by a pile-up of bobbins under the ball, the switch will be open, whereas the weight of the ball 161 on the filament of other depending connection 166 normally keeps the switch closed. The switches 163 and 165 are normally closed when no bobbins are adjacent their respective feeler fingers 167, 169; however, the movement of a bobbin or quill into engagement with either of the feeler fingers 167 or 169 will cause the respective feeler finger to be moved laterally in the slot 137 and thereby open its respective switch 163 or 165. The fingers 167 and 169 are constructed of suitable material such as wire or the like which will not impede the passage of bobbins or quills thereby and are spaced apart along the length of the slot 137 by a distance of approximately two or three bobbin or quill diameters. As will be seen in FIGURE 1, the switches 163 and 165 are in mutual parallel relation and are in series connection with the switches 157 and 159 and the solenoid valve 95 as well as the source of E.M.F. It will thus be seen that the opening of switch 157 through the weight-overload of floor 119, or the opening of switch 159 through the raising of ball 161, or the concurrent open relation of both switches 163 and 165, will result in the deenergization of solenoid valve 95 and the consequent cut-off of the air supply through the rotary reversing valve section 37b to the drive motor 91 for the second shaker 89. The advantages of the height-sensing switch arrangement 159, 161 and the weight-sensing switch arrangement 157 will readily be apparent. It will also be apparent that an advantage of the parallel switch arrangement 163—169 lies in the provision of an additional control for the motor 91 whereby the motor is stopped upon the overfeeding of too large a number of bobbins through the discharge end of the slot 137 such that the bobbins or quills are backed up to or past both of the fingers 167 or 169.

In the normal use of the apparatus for feeding quills or bobbins to a bobbin or quill-stripping apparatus it is desired that the bobbins or quills be substantially continuously supplied to the stripping apparatus in order to achieve the greatest efficiency. It is therefore of considerable advantage that the friction driving belts 133 and 135 form the output conveyor of this arrangement in order that the quills may be fed up to the discharge point by the conveyor 131 and permitted to be backed up thereon without the occurrence of harm either to the conveyor or to the bobbins, and that in this connection there is provided a switch arrangement for the supply shaker 89 thereto which is sensitive to the back up of quills or bobbins in the upper discharge end of the conveyor 131, yet which permits the normal passage of quills or bobbins therepast without stopping the shaker 89. Also, the most advantageous operation of the device is accomplished when the shaker 89 runs substantially continuously, this being accomplished through the interrelationship of the reciprocating feeding action of the shaker 89, and the speed of the belts 133 and 135, in respect of each other and the apparatus, if any, to which the bobbins or quills pass after leaving the conveyor 131. This is a matter of individual setting, depending upon the size of the particular bobbins or quills and the speed of operation of the stripping apparatus or other apparatus to which the bobbins are to be fed, and must be worked out for each individual case. We have found, however, that for one particular application of the invention wherein filling bobbins or quills of standard size and construction are employed, a reciprocating speed of 65 strokes per minute for both the motors 30 and 91 is satisfactory, with the first shaker 19 having a stroke length of approximately 3¼ inches and the second shaker 89 having a stroke length of approximately 2¾ inches, to supply quills to a quill stripping apparatus adjacent the discharge end of the belt conveyor 131, with the quills stripping apparatus operating at a rate of approximately 150 to 250 quills or bobbins per minute.

While the manual start and stop control for energizing the control circuit and the main drive motor (next to be described) have been omitted for the sake of clarity since such per se do not form a part of the invention, it will readily be apparent that a suitable manual switch arrangement may be provided for simultaneously connecting all of the circuits to the source (or sources) of E.M.F. and disconnecting them therefrom, as may be desired.

As will be seen in FIGURE 1 the drive motion imparted to each of the various cutters is effected through the employment of a single motor 171 and suitable belt and pulley drives 173, 175, 177, etc., connecting between the motor and the drive shaft such as shaft 75 (see FIGURE 3) of the various roll cutter arrangements 65, 115 and 145 (the belt connection to the cutters 145 being omitted for the sake of clarity). Additionally the motor 171 serves to drive the dual rotary air reversing valve 37 through the medium of belt 173, shaft 174 and belt 179. It will be apparent that the operation of the motor 171 is continuous in order to continuously drive the various roll cutters, and also to rotate the rotary valve 37 to effect reversal of air flow through the conduits to the two air driven motors 30 and 91.

As seen in FIGURE 6 the conveyor 131 may ideally be used in conjunction with a slide composed of a pair of vertically spaced apart side plates 181 forming a longitudinally downwardly extending slot therebetween and an upwardly extending guide surface 183 on which the heads of the quills ride after leaving the discharge end of the friction-conveying ball arrangement 131. As disclosed in the co-pending application of Richard Ferguson and James Brown, Serial No. 543,107, filed October 27, 1955, now U.S. Patent No. 2,813,616, there is preferably disposed above the slide 181, 183 a hold-down bar 185 pivotally mounted as indicated at 187 and having an adjustable stop 189 therefor. The hold-down bar 185 engages the head of each succeeding bobbin or quill as it passes under the forward end 185a thereof while riding down the slide 181, 183, and thereby retards the quills or bobbins in such a manner as to cause a back-up of the quills or bobbins from the forward end 185a thereof, rearwardly along the slide 183, thus resulting in a substantially continued grouping of a supply of bobbins or quills on the slide 183, with the individual bobbins being discharged from beneath the end 185a to the hold-down bar through the striking action on the rearmost bobbin in the group by the succeeding bobbins conveyed by the friction-conveying belt conveyor 131. An additional function of the hold-down bar 185 is to aid in guiding the change of direction of the quills or bobbins at the junction point between the conveyor 131 and the slide 183.

It will thus be seen in conjunction with the hold-down bar 185 that it is of substantial importance (though not absolutely necessary) that the conveyor 131 be a friction-type conveyor since it is only through this type of conveyor that an overfeed arrangement is possible such as to provide a substantially continuous flow of bobbins to a final apparatus such as a quill stripper generally indicated at 191 at the discharge end of the slide 183.

Figure 7:
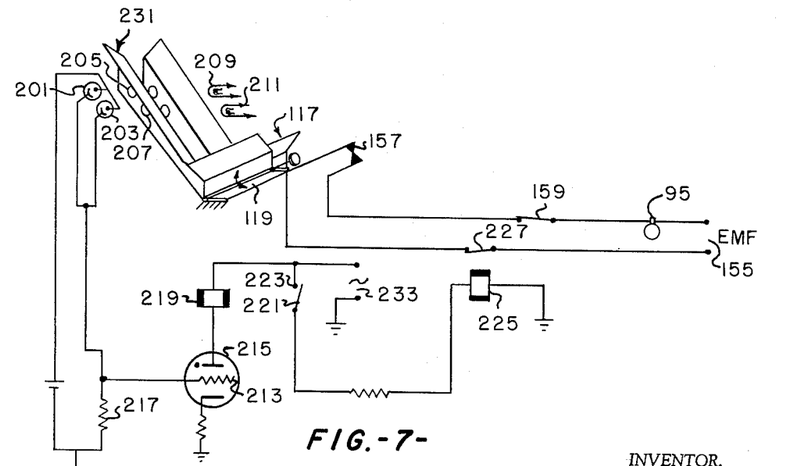
FIGURE 7 is a schematic diagram illustrating a modified control circuit arrangement.

Referring now to FIGURE 7, there is shown a modification of a portion of the control circuit for the drive motor 91 which reciprocates the final shaker 89. In this arrangement a pair of photocells 201, 203 and associated circuitry are substituted for the mechanical switches 163—165 of the arrangement in FIGURE 1. The photocells 201 and 203 are suitably mounted in spaced-apart relation along one longitudinal side of the trough-shaped belt conveyor 231, which conveyor is substantially similar to the conveyor 131 described in connection with FIGURE 1. Each photocell is aligned with a respective one of two pairs of apertures 205, 207 formed in the depending side plates of the conveyor 231. Disposed on opposite sides of the conveyor 231 and also in alignment with the apertures 205 and 207 and the photocells 201 and 203 are two light sources such as electric lamps 209, 211. For quills of conventional size these apertures 205 and 207 are spaced apart approximately 2⅛ inches along a direction parallel to the feed axis of the conveyor 231, such that a line-up of three or more quills adjacent to each other on the conveyor belt at this point will interrupt light passing through both pairs of apertures 205 and 207 and will thereby break the light circuit to both of the photocells or other photo-sensitive elements 201, 203. The cells 201 and 203 are connected in parallel as stated above and control the control grid 213 of a thyratron or other gaseous grid controlled type tube 215 which is normally biased below cut off by the voltage appearing across grid resistor 217 when either or both of the photocells 201, 203 are conducting (i.e. when light impinges thereon through apertures 205 and 207). Thus, light must be interrupted in front of both cells 201 and 203 before the negative bias on grid 213 is removed and the thyratron 215 fires. This results in energization of a relay 219 having its energizing coil in the plate circuit of the thyratron 215 and having a normally open contact arm 221 and contact 223 in series connection with the energizing coil of a second slow-moving relay 225. Thus, energization of relay 219 causes this contact arm 221 to close with contact 223 and thereby completes the energization cycle for slow-opening relay 225. The relay 225 has a normally closed contact arm 227 in series connection with the switch 157 associated with the hopper 117 and associated pivotally mounted bottom 119 as described in connection with FIGURE 1, and as shown again in FIGURE 7 for the purpose of illustrating the schematic connection between the contact arm 227 and the control circuitry for the solenoid valve 95 and the air driven motor 91 controlled thereby. The switch effectively formed by the contact arm 227 is also in series connection with the switch 159 (see FIGURE 1) and the solenoid valve 95 and the source of E.M.F. 155 similar to the series connection in FIGURE 1. The slow opening of relay 225 will result in the opening of contact arm 227 in the energizing circuit to solenoid valve 95, thereby deenergizing this solenoid valve and stopping the motor 91. Also, it will be apparent that opening of either switch 157 and 159 will similarly cause the stopping of motor 91 as in FIGURE 1. The slow opening of the relay 225 acts to permit a series of pulses from the photocell circuit, caused by quills passing in alignment, without resulting in the full energization of the relay 225 such as to open the contact arm 227, and thus not interrupt the operation of the motor 91 during normal running operation of the belt conveyor 231; the relay 225 being fully actuated so as to open the contact arm 227 only after a sufficient time delay as to substantially insure that the interruption of light across the apertures 205 and 207 is caused by actual back-up or jamming of quills rather than mere intermittent simultaneous interruption as may occur during normal conveying operation when no quills are backed up to or jammed at this point.

The thyratron tube 215 has an A.C. E.M.F. applied to the plate thereof from a suitable source, as indicated generally at 233, in order to provide for substantially immediate cut-off of the tube 215 when either of the photocells 201 or 203 is reenergized after any particular blocking and resultant denergization of both of the photocells.

Figure 11:
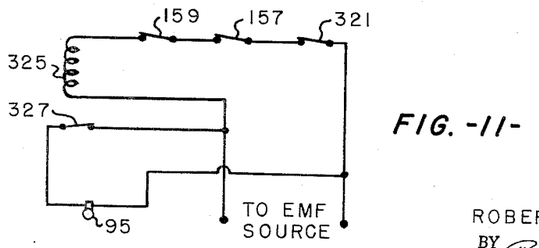
FIGURE 11 illustrates a schematic diagram of a further modified control circuit arrangement.

A further modification may be made as shown in FIGURE 11, wherein a time delay relay arrangement is provided, having a single switch 321 substituted for the dual control switches 163—169 of FIGURE 1 or the dual photocell arrangement of FIGURE 7, for opening the control circuit to the solenoid valve 95. Time delay relay 325 may be energized through the switch 321 which may be disposed adjacent the discharge end of the conveyor 131 similar to the dual switch arrangement shown in FIGURE 1. The energization circuit for slow opening relay 325 may also include switch 159 associated with the overfeed ball 161, and switch 157 associated with weight overload floor 119 (as shown in FIGURE 1). Thus, opening of any one of switches 321, 157 or 159 will cause relay 325 to be energized, thereby opening relay contact 327 and the solenoid valve circuit after a predetermined time delay and thereby stopping the flow of air to the air motor 91. If desired, a solenoid valve which has closed valve ports when energized might be utilized, in which case the contact 327 would normally be maintained open. Also the relay might be arranged in normally deenergized circuit relation, with the switches 157, 159 and 321 being in mutual parallel connection and in series connection with the coil of relay 325. The closed switch arrangement is preferred, however, since this provides a fail-safe feature, whereby if the circuit power fails the air through the solenoid valve 95 will be cut off rather than uncontrollably passed therethrough. In a further modification (not shown) a time delay relay may suitably be energized (or deenergized, as the case may be) as through the operation of a depending overhead supported lightweight ball such as that illustrated at 161 in FIGURE 1, with the ball being suitably disposed slightly above the heads of the bobbins as they proceed along the trough-shaped belt conveyor 131, or alternatively by upward movement of the hold-down arm 185 for a predetermined time. In this latter modification (not shown) the switch 321 may be omitted, with the switch associated with the lightweight ball or hold-down arm serving the dual purpose of switches 157 and 321 of FIGURE 11. Also, if desired, only one or more of the switches 157, 159, or 321 might be arranged in circuit controlling relation with the solenoid valve through the medium of a time delay relay, while the other of these switches may be arranged in direct circuit controlling relation with the solenoid valve 95, although each of these later mentioned possible modifications are generally less desirable than that illustrated in FIGURE 11. It will be seen that the general purpose of these modifications is to require a continuous impulse from any one of these switches or switch actuating media associated with the feeding of the bobbins or quills on the belt conveyor 131 for a predetermined time, such as half a second or a second or so, in order to stop the shaker 89. The object is thus to keep the apparatus feeding until an actual build-up of quills at one point or another, for a definite period, causes the shaker to stop.

Figure 4:
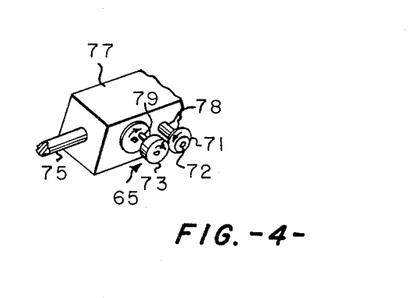
FIGURE 4 is a fragmentary view in perspective illustrating one of the pairs of cutter rolls as employed in the invention.
Figure 8:
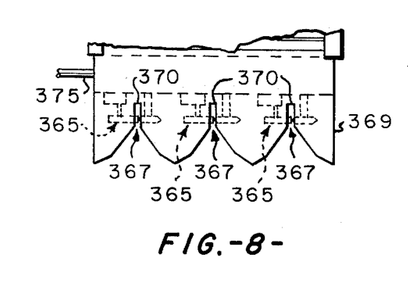
FIGURE 8 is a plan view illustrating a modified form of guide arrangement for the roll cutters.

A modification of the guide plate for guiding the yarn ends or tails into the bite of the roll cutters is illustrated in FIGURE 8, wherein three pairs of roll cutters 365 are shown, the pairs of roll cutters being substantially similar to the roll cutter arrangement of FIGURE 4 and being driven as through a drive shaft 375 similar to drive shaft 75 of FIGURE 4. In this modification the guide opening 367 associated with each of the pairs of roll cutters 365 is formed with a narrow longitudinal slot 370 at the apex end thereof each of which slots 370 is in direct alignment with the bite of its associated pair of roll cutters 365. The yarn ends are thus guided by the tapered sides of the guide openings 367 into the slots 370 and into the bite of the roll cutters 365 where they are severed.

Figure 9:
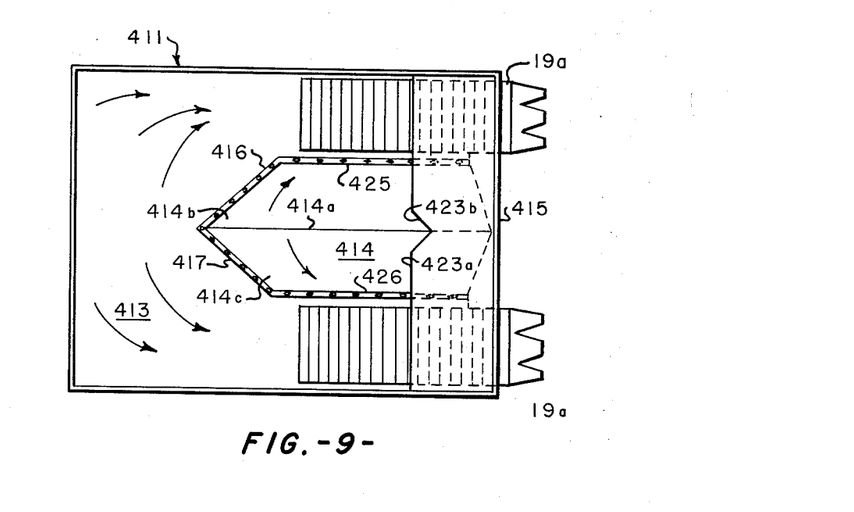
FIGURE 9 and 9a are plan and elevation views schematically illustrating an alternative bin arrangement employing a dual shaker arrangement.
Figure 9A:
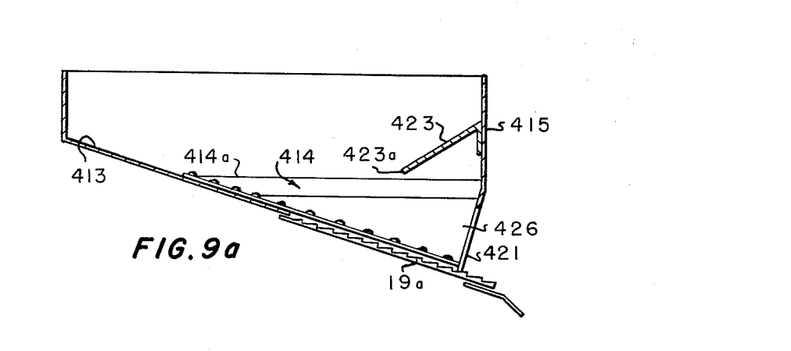

In a further modification, a single bin may be employed for supplying quills or bobbins to two or more spaced apart shaker arrangements 19, etc., as shown for example in the embodiment illustrated schematically in FIGURES 9 and 9a and 10 and 10a. In the embodiment of FIGURES 9 and 9a the bin 411 has a forwardly sloping bottom 413 which effects forward movement of bobbins, quills, or the like, which may be dumped thereonto as over the rear wall of the bin 411, downwardly and forwardly onto the two shakers 19a. Disposed between the two shakers 19a there is provided an arched or humped plate section 414 which may be either suitably secured to the bottom of the floor (as shown) or formed integral therewith. In the illustrated embodiment, the plate section 414 has a central backbone indicated at 414a formed at the apex of an arch formed by two mutually integral inwardly and upwardly directed arch plate sections 414b and 414c. The arch plate sections 414b and 414c and the sloping bottom 413 may meet along laterally inclined lines 416, 417 as indicated in FIGURE 9 or alternatively such may form a smooth unbroken curved continuation, as may be desired. It will also be apparent that the arch 414 may be formed either by two separate plates 414b, 414c joined together or as one unitary arch plate as shown or, as stated above, as a unitary continuation of the sloping bottom 413. Likewise, the arch 414 may be upwardly convexly smoothly curved instead of employing two flat surfaces 414b and 414c terminating along an apex backbone 414a, although for purposes of ease of construction and in order to positively direct all bobbins downwardly from all points on the arch 414, it is most advantageous to form the arch with two upwardly inclined surfaces 414b and 414c as shown with a central longitudinal apex 414a formed therebetween. A substantially vertically extending side plate 425, 426 is connected between the lower longitudinal edge of each of the arch plates 414b and 414c respectively and the sloping bottom 413. A rearwardly and downwardly sloping overhead baffle plate 423 is secured to the front wall 415 of the bin and extends laterally across the bin in order to prevent a large mass of bobbins from crowding around the discharge opening 421, similarly to the baffle 23 in FIGURE 1. The baffle 423 is preferably disposed with its lower edge surface 423a above the upper surface of the arch 414 in order to permit the passage of bobbins therebeneath, and in this connection may be provided with a V-shaped notch 423b if desired. It will thus be apparent that the flow of bobbins in this bin arrangement is somewhat generally similar to that in the bin arrangement of FIGURE 1, with the further advantage that bobbins are fed in two generally opposite circular directions as indicated by the arrows in FIGURE 9 downwardly and onto the shakers 19a where they are discharged through the discharge opening 421. This arrangement is particularly adapted for the pouring up of the bobbins or quills into the bin 411 from the rear thereof with the bobbins then flowing downwardly on the sloping surface 413 and on the arch 414 onto the shakers 19a.

Figure 10:
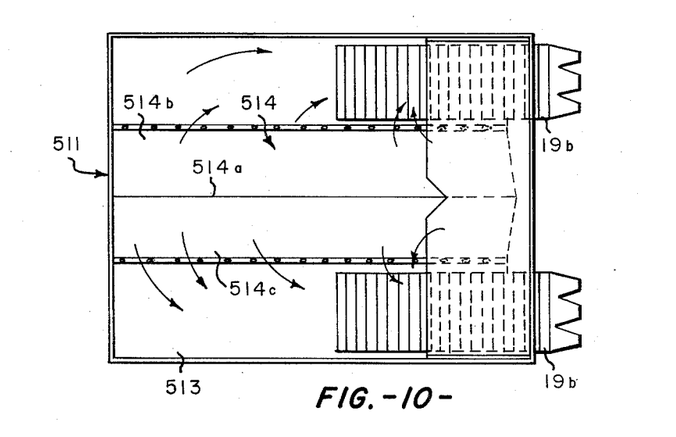
FIGURES 10 and 10a are schematic plan and elevation views schematically illustrating a further modified dual-shaker bin arrangement.
Figure 10A:
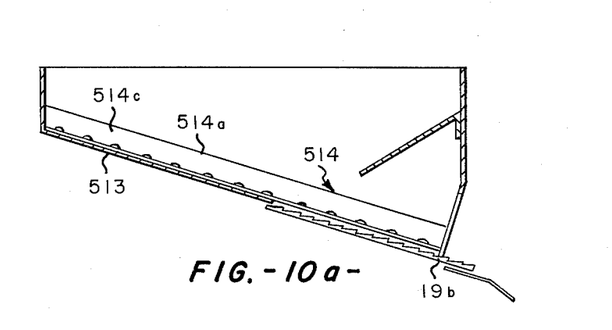

In the further alternative embodiment illustrated in FIGURES 10 and 10a, the bin construction is generally similar to that of FIGURES 9 and 9a, with the exception that the arch 514 has a downwardly sloping backbone 514a formed between a pair of side plate sections 514b and 514c. The slope of the backbone 514a of the arch 514 is substantially the same as that of the floor 513 of the bin 511. Thus the lower longitudinal edge of the arch plate sections 514b and 514c directly meet the bottom or floor 513 of the bin along two substantially parallel lines. It will be understood that the entire bin floor may be formed to include as one integral member both the flat sloping portion generally indicated at 513 and also the arch 514 as desired, although for purposes of structural strength and construction it is generally desired to have at least two separate members 513 and 514 to form these various surfaces. While the generally circular direction of quill flow is not so pronounced in this latter embodiment as it is in the first two illustrated bin embodiments of FIGURES 1 and 9, it will be apparent that there is also a generally circular type flow downwardly onto each of the shakers 19b in this embodiment, the laterally oppositely directed flow onto each of the shakers 19b being materially aided by the arch 514.

It will be apparent that various of the other novel aspects of the invention might be employed without requiring any one of these particular bin constructions or arrangements without departing from the scope or spirit of the overall invention, or a bin might suitably be employed with other of the novel aspects of the invention without utilizing the circular group flow of the objects therein, although the illustrated arrangements are considered most advantageous in achieving the desired unitary result and function of the overall invention in facilely handling, separating, conveying and positioning quills, bobbins or the like having yarn tails or the like extending therefrom and therebetween, and are thus preferred.

While several embodiments constructed according to the various aspects of the invention have been specifically illustrated and described herein, it will be apparent to those skilled in the art that many additional modifications and further embodiments may be made within the scope and spirit of the invention. For example, the pivotally mounted door 57 on the supply bin 11, the control switch 153 and the height-sensitive switch 159 may each be omitted in embodiments where the fine degree of control obtained therewith is not necessary. Also various aspects of the invention may be employed without the necessity of employing other aspects therof, and various combinations of the aspects may be used.

A further modification which will be apparent is the substitution of other types of drive arrangements for the reciprocating shakers 19 and/or 89 in lieu of the air driven motors employed in FIGURE 1. It will also be seen that in some special instances wherein only a relatively few yarn ends or the like are required to be severed, a single shaker and associated cutter arrangement may be employed, if desired, although, as will be apparent, it is normally much more advantageous to employ two reverse-flow shakers as disclosed in the preferred embodiment. It will also be seen that there may be instances in which the reverse flow belt conveyor 131 may be omitted, although it will be readily apparent that this reverse flow or counter-reverse-flow arrangement is extremely advantageous in causing the yarn ends which extend between the lower reverse flow or counter-reverse flow conveyor and the upper conveyor to be pulled into the bite of the cutters.

In view of the many further modifications and embodiments which may be made within the scope and spirit of this invention, it is to be understood that the invention is not to be limited by the foregoing detailed or general descriptions of either the preferred embodiment or various specific modifications, but only by the scope of the appended claims.

That which is claimed is:

1. Appartus for separating and preparing entangled quills, bobbins or the like comprising first and second conveyors for tail-carrying quills or bobbins or the like, said first conveyor being disposed above and in feeding relation to said second conveyor, an electro-responsive bobbin back-up and jam detector disposed adjacent the discharge end of said second conveyor, drive means operatively connected in driving relation to said first conveyor, said bobbin back-up and jam detector being connected in controlling relation to said drive means, and a yarn tail cutter disposed between said conveyors.

2. Appartus according to claim 1 wherein said bobbin back-up and jam detector comprises a pair of photocells disposed in spaced apart relation along the path of bobbins on said second conveyor, a relay, said photocells being connected in mutual parallel relation and in controlling relation with said relay, said relay being connected in controlling relation with said driving means.

3. Apparatus according to claim 2 wherein said detector further comprises a gaseous control tube having a control electrode, said photocells being connected in bias-controlling relation to said electrode, said tube being connected in controlling relation to said relay.

4. Apparatus according to claim 1 wherein said jam detector comprises a bobbin detector disposed adjacent the path of the bobbins on said second conveyor, and a time delay relay operatively connected in controlling relation to said drive means.

5. Apparatus for separating and preparing entangled quills, bobbins or the like comprising first and second conveyors for tail-carrying-quills or bobbins or the like, said first conveyor being disposed adjacent and in feeding relation to said second conveyor, an electro-responsive bobbin back-up and jam detector disposed adjacent the discharge end of said second conveyor, drive means operatively connected in driving relation to said first conveyor, said bobbin-back-up and jam detector being connected in controlling relation to said drive means, and a yarn tail cutter disposed between said conveyors.

6. Apparatus for separating and preparing entangled quills, bobbins or the like comprising first and second conveyors each having a bobbin flow path for tail-carrying-quills or bobbins or the like, said first conveyor being disposed adjacent and in feeding relation to said second conveyor, an electro-responsive bobbin overfeed detector disposed adjacent the bobbin flow path on said second conveyor, drive means operatively connected in driving relation to said first conveyor, said bobbin overfeed detector being connected in controlling relation to said drive means, and a yarn tail cutter disposed between said conveyors.

No references cited.